United States Patent Office 3,559,011
Patented Jan. 26, 1971

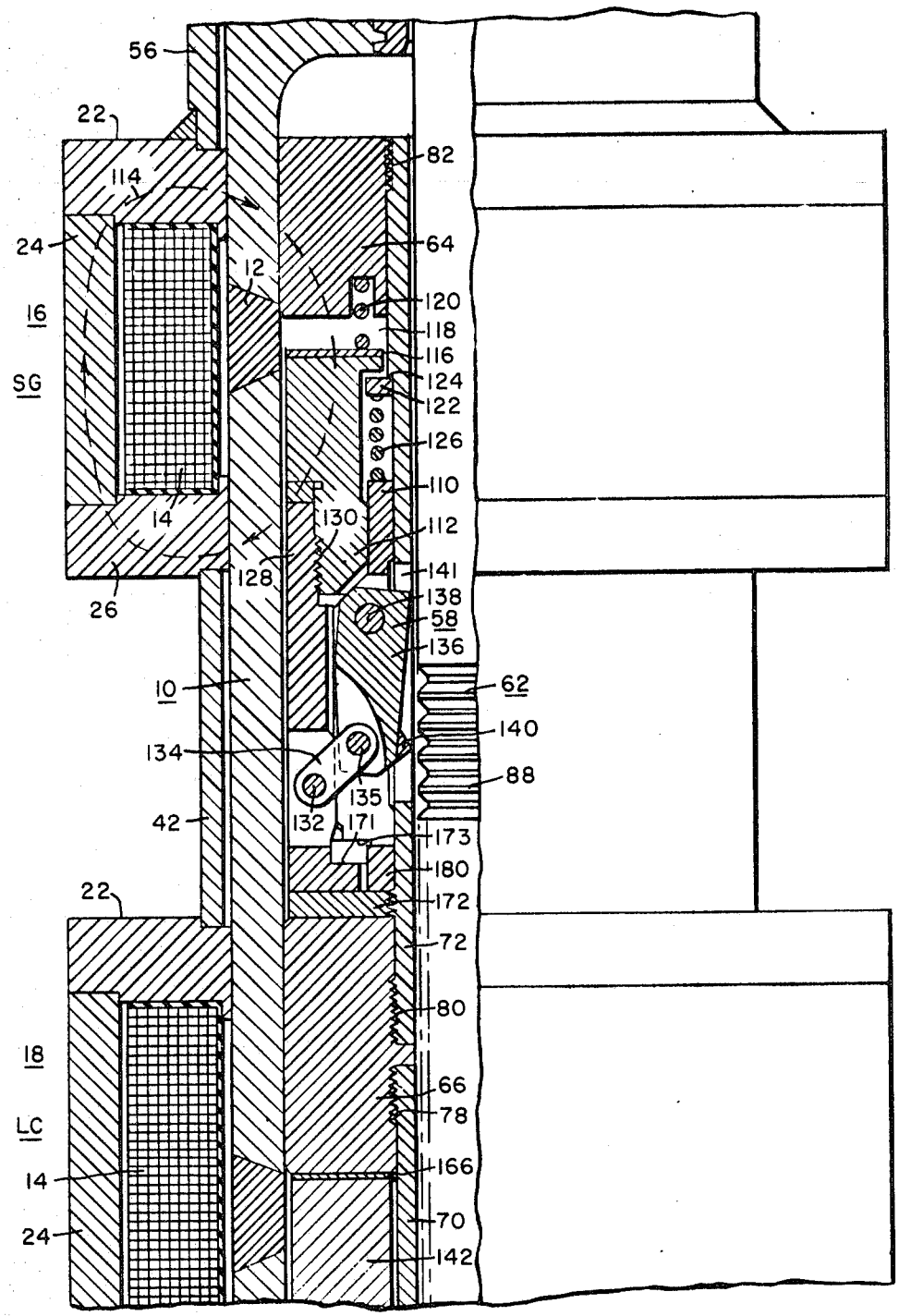
FIG. IA.
INVENTOR
Robert F. Edwards.

3,559,011
CONTROL SYSTEM FOR A LINEAR
MOTION DEVICE
Robert F. Edwards, Murrysville, Pa., assignor to Westinghouse Electric Corporation, Pittsburgh, Pa., a corporation of Pennnsylvania
Filed Sept. 5, 1969, Ser. No. 855,595
Int. Cl. H02k 41/02
U.S. Cl. 318—135   9 Claims

ABSTRACT OF THE DISCLOSURE

The speed of operation of a linear motion device of the magnetic jack type is increased by reducing the mechanical dropout time of the operating magnets of the device after deenergization of the operating coils of the magnets. Circuit components are utilized to apply, in the normal sequence, full voltage to each coil circuit long enough to produce the required mechanical action, then to reduce the voltage, and hence the current and the strength of the magnetic field, to some value not less than that required to hold the device mechanically in the required position. The coil circuit is then opened to initiate the mechanical dropout of the magnet and complete the cycle.

BACKGROUND OF THE INVENTION

This invention relates, generally, to linear motion devices and, more particularly, to a system for controlling the operation of a linear motion device of the magnetic jack type.

Prior power supply systems for linear motion devices of the magnetic jack type utilize switches and contactors, or semiconductor devices, to connect power at a fixed voltage to the operating coils of a device in a programmed sequence. One of the factors which limits the speed of operation of the device is the delay in mechanical dropout time after deenergization of a particular operating coil due to the practical limitations on the rate of decay of the magnetic field flux.

An object of this invention is to increase the speed of operation of a linear motion device of the magnetic jack type by reducing the dropout time of the operating magnets of the device.

Another object of the invention is to provide for reducing the delay in the mechanical dropout time of the operating magnets by reducing the strength of the magnetic field of a magnet operating coil after the requirement for full field strength has passed, but prior to the time that complete deenergization of the coil is scheduled.

Other objects of the invention will be explained hereinafter or will be apparent to those skilled in the art.

SUMMARY OF THE INVENTION

In accordance with one embodiment of the invention, circuit components are provided to apply, in a normal sequence, full voltage to each magnet operating coil of a linear motion device long enough to produce the required mechanical action, then to reduce the voltage, and hence the current, to a value not less than that required to hold the device mechanically in the required position, and then to open the coil circuit and thus initiate the mechanical dropout to complete the cycle.

BRIEF DESCRIPTION OF THE DRAWINGS

For a better understanding of the nature and objects of the invention, reference may be had to the following detailed description, taken in conjunction with the accompanying drawings, in which:

FIGS. 1A and 1B, when taken end-to-end, constitute a view, partly in elevation and partly in section, of a magnetically operated linear motion device operated in accordance with principal features of the invention.

DESCRIPTION OF THE PREFERRED EMBODIMENT

The drawings illustrate the manner in which the present invention can be utilized in a linear motion device of the magnetic jack type such as described in Pat. 3,158,-766, issued Nov. 24, 1964, to E. Frisch and assigned to the Westinghouse Electric Corporation. The aforesaid device is of a gripper type in which three electromagnetic devices are utilized to provide incremental, or step-by-step, linear motion of a linearly movable element. Each of the electromagnetic devices includes a solenoid coil and a relatively stationary pole and a movable pole. Two of the coils are utilized to provide, when energized, latching of the two gripper assemblies of the linear motion device. The third coil achieves raising or lowering, as the case may be, of the linearly movable element.

As described in the aforesaid patent, the gripper members of the linear motion device may be located in three relative positions with respect to the linear element which is moved thereby. One of the relative positions is defined as the "unlatched" position wherein the gripper is not in position for engagement with the teeth of the linear movable element. A second relative position is defined as the "latched" position wherein the gripper is engaged with the linearly movable element and the gripper is subjected to the load or weight of the movable element. The third relative position of the component is defined as the "coupled" position wherein the gripper is located in its engaged position relative to the linearly movable element, but the gripper is not subjected to the load created thereby. In other words, a clearance exists between the teeth of the linearly movable element and the tip of the gripper member.

Figure 1B:
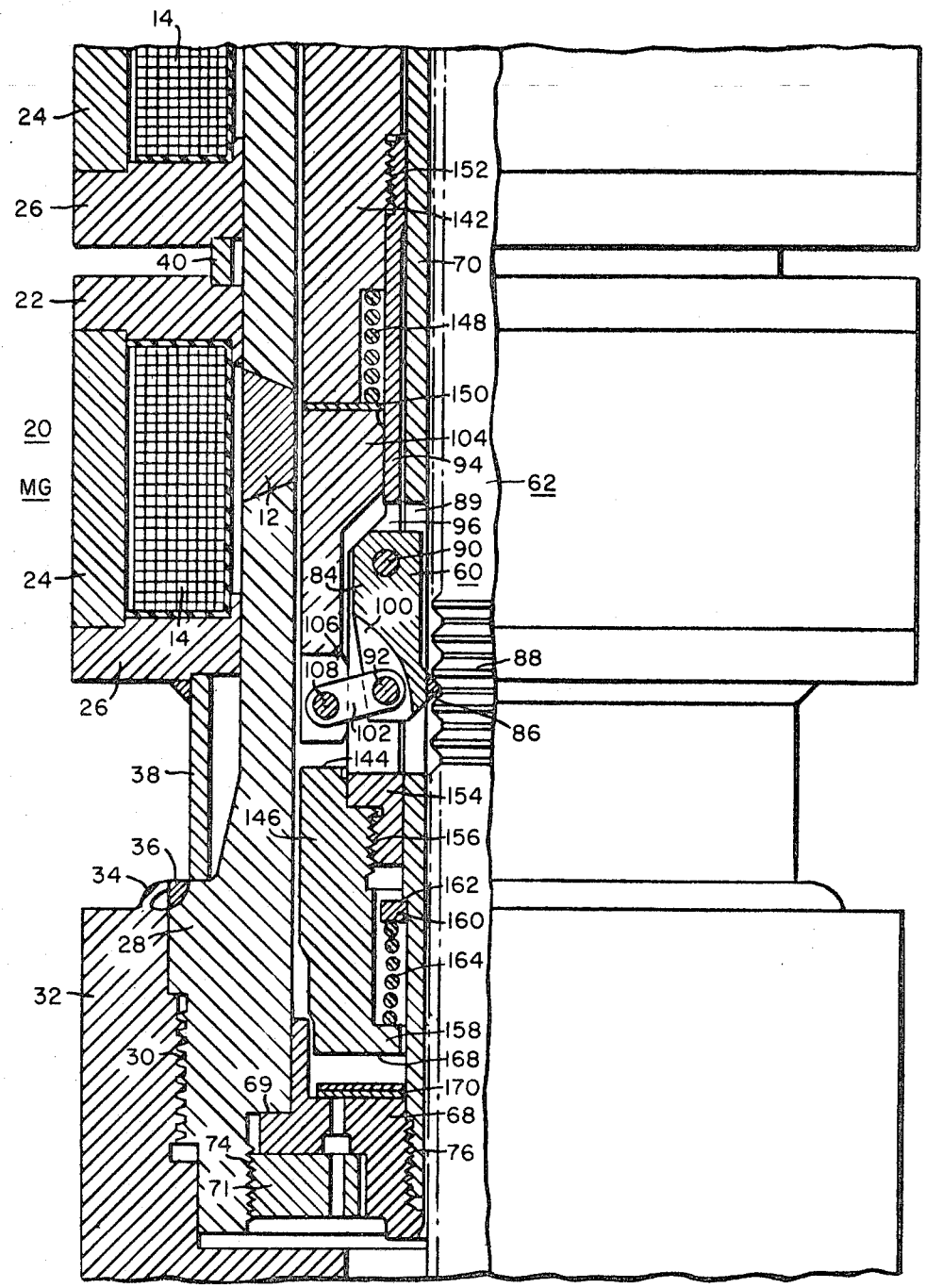

As illustrated in FIGS. 1A and 1B of the drawing, the linear motion device is provided with tubular outer housing 10, formed from magnetic material of a thickness capable of withstanding relatively high internal pressures. The housing 10 is provided with a plurality of spaced, circumferential weld inserts 12 disposed between adjacent axial portions of the housing 10 and formed from non-magnetic material. The function of the weld inserts 12 is to interrupt a shunting magnetic path which would exist along the housing 10 in the axial direction were the housing formed completely from magnetic material.

The housing 10 is provided with a plurality of annular solenoid coils 14 mounted in an axially spaced array on the outer surface thereof in positions juxtaposed respectively to the non-magneic weld inserts 12. In the present structure, three solenoid coils 14 are provided on the housing 10 to form solenoids 16, 18 and 20 for the linear motion device. The solenoid coils 14 are each provided with a support structure including annular magnetic portions 22, 24 and 26 which form part of a flux path for magnetic flux generated by each of the coils 14. The annuli 22 and 26 are mounted respectively above and below each of the coils 14 and are formed from magnetic material. Likewise, the annulus 24 is formed from magnetic material and is disposed outwardly of the coil 14 in juxtaposed relationship therewith and bridging the outward edges of the adjacent annuli 22 and 26. The solenoids 16, 18 and 20 are formed to be slid over the outer surface of the housing 10 and are fixedly disposed in positions juxtaposed to the non-magnetic inserts 12 of the housing 10 by a plurality of spacers.

The lower end of the housing 10 is provided with an outward flange 28 having threads 30 on its outer surface which are positioned to receive a lower housing member 32. The lower housing member 32 is threadedly secured to the lower flange 28 and is desirably formed at its lower end (not shown) to be secured in a suitable hermetic manner to a pressurized system with which the linear motion device is utilized. The lower housing 32 is provided with an annular canopy 34 which extends in close proximity with a portion of the flange 28 for the purpose of permitting an annular seal weld 36 between the canopy 34 and the flange 28 for sealing hermetically the housing 10 to the lower housing 32.

The solenoids 16, 18 and 20 are fixedly positioned relative to the non-magnetic inserts 12 by means of spacing sleeves 38, 40 and 42. The spacing sleeve 38 is disposed between the flange 28 and the lower surface of the annulus 26 of the solenoid 20. The spacing sleeve 40 is disposed between the annuli 22 and 26 of the solenoids 20 and 18, respectively. Likewise, the spacing sleeve 42 is disposed between the annuli 22 and 26 of the solenoids 18 and 16, respectively. An additional spacing sleeve 56 may be similarly mounted on the annulus 22 of the upper solenoid 16 for the purpose of providing a fixed mounting arrangement for the solenoid. The upper end of the spacer 56 may be secured to a suitable annulus, such as a locking ring (not shown), which may be threadably mounted on the outer periphery of the housing 10 and disposed to engage the spacer 56 to prevent relative movement of the solenoids 16, 18 and 20 with respect to the housing 10. In this manner the solenoids may be easily assembled to the linear motion device merely by slipping them over the top of the housing 10 into the position shown in the drawing and similarly may be removed in the event inspection of the housing 10 is desired. The upper end of the housing 10 is desirably closed off by a cover (not shown) which may be secured to the housing 10 by suitable means, for example welding, to insure hermetic integrity of the housing 10.

The interior of the housing 10 is formed to receive a pair of gripper assemblies 58 and 60 which are mounted for movement within the housing 10 relative to a linearly movable element or lead screw 62. By energizing the solenoid coils 16, 18 and 20 in a predetermined sequence, the gripper assemblies 58 and 60 are movable independently of each other to the "latched," "coupled," and "unlatched" positions relative to the lead screw 62 in a manner to be described. Movable gripper supports forming a part of the gripper assemblies 58 and 60, respectively, are movable relative to the interior of the housing 10, and between fixed stop members 64 and 66 and 68. The stop members 64, 66 and 68 are fixed in position relaitve to the housing 10 by means of spacing sleeevs 70 and 72.

In furtherance of this purpose, the lower stop member 68 is clamped against a shoulder 69 on the housing 10 by a locking ring 71. The locking ring 71 is threadably secured to the interior of the housing 10 adjacent to the flange 28 by complementary threads 74. The lower spacing sleeve 70 is secured at its lower end to the lower stop 68 by complementary threads 76. The intermediate stop member 66 is threadably secured to the upper end of the lower spacing sleeve 70 by complementary threads 78. Positioning of the upper stop 64 is achieved by threadably securing the upper spacing sleeve 72 to the intermediate stop 66 at 80 and to the upper stop 64 at 82. The upper stop 64 and the intermediate stop 66 form portions of the magnetic circiut for the solenoids 16 and 18, respectively, and, therefore, must be formed from magnetic material. The lower stop 68 and spacing sleeves 70 and 72 do not form portions of the magnetic circuit of the linear motion device and may be formed from non-magnetic material. Each of the stops 64, 66 and 68 is of an annular configuration to surround the lead screw 62, thereby permitting the securing of the stop members to the respective spacing sleeves 70 and 72.

As described in the aforesaid patent, the lower gripper assembly 60 is provided with three circumferentially spaced gripper arms 84 preferably formed from a corrosion resistant material. Each arm 84 is provided at the lower end with an inwardly extending tip 86 which is of a size to fit closely between spaced teeth 88 of the element 62. The tips 86 are preferably formed from an extremely hard material, such as Stellite, to permit long operating lives therefor. The tip 86 of each gripper arm 84 is of a size and shape to provide slight clearance spaces when it is disposed in the "coupled" position in the groove formed between each pair of adjacent teeth 88.

Each of the gripper arms 84 is pivotally mounted at two separate places by means of pivot pins 90 and 92. A movable latch support tube 94 extends above the gripper arm 84 and is provided with three axially extending circumferentially spaced cut-outs 96 which are coextensive with and receive the gripper arms 84. The pivot pin 90 is received in flanges on opposite sides of the cut-out 96 in the latched support tube 94. In this manner, the gripper arms 84 are pivotally movable relative to the latch support tube 94 with the axis of such pivotal movement being the pivot pin 90. Such pivotal movement of the gripper arms 84 permits movement of the tips 86 through openings 89 in the spacer tube 70 toward the element 62. The lower end of each of the gripper arms 84 is provided with a slot 100 therein which receives one end of a link member 102. This end of the link member 102 is provided with an opening therein which receives a pivot pin 92 to permit pivotal movement of the link member 102 about the axis formed by the pivot pin 92. A movable latch operating magnetic pole or support tube 104 of annular configuration is disposed between the inner surface of the housing 10 and the outer surface of the latch support tube 94. The lower end of the latch operating support tube 104 is provided with an inwardly extending groove 106 which receives the adjacent end of the link member 102. This end of the link member 102 is provided with an opening therein disposed in alignment with opposed openings in portions of the pole member 104 adjacent the groove 106. A pivot pin 108 is disposed in the last-mentioned aligned opening and passes through the link member 102.

Movement of the gripper arms 84 into and out of engagement with the lead screw 62 is accomplished by movement of the latch operating magnetic pole 104 relative to the latch support tube 94. For example, movement of the pole 104 downwardly relative to the tube 94 causes the link member 102 to pivot relative to both of its pivotal axes. Thus, the pivot pin 108 moves downwardly with the resulting effect being that the pivot pin 92 is moved toward the latch operating pole 104. This movement of the pivot pin 92 causes the gripper arm 84 to pivot about the pin 90, thereby moving the tip 86 of the gripper arm 84 out of engagement with the teeth of the lead screw 62. The upper gripper structure 58 (FIG. 1A) is illustrated in this last-mentioned position.

With respect to the upper gripper arrangeemnt 58, it is to be noted that the grippers are formed in essentially the same manner as the gripper arms for the lower gripper arrangement 60. Basically, the only differences between the upper and lower gripper arrangements are in the formation of an upper gripper support tube 110 and the formation of a latch operating magnetic pole or support 112 for the upper gripper arrangement 58. With those exceptions, the construction of the upper gripper arrangement 58 and the operation thereof are the same as that for the lower gripper arrangement 60.

The upper solenoid 16 is formed to provide a generally toroidal path for magnetic flux generated thereby. The toroidal magnetic flux path is illustrated by the arrows 114 which pass through the sleeve 24, member 22, housing 10, the stop or stationary pole 64, latch operating magnetic pole or plunger 112, housing 10, lower end sleeve 26 and returning to the sleeve 24. The flux path solenoid 18 is constructed to be exactly equal to the thread pitch of the lead screw 62 for a purpose hereinafter described.

Figure 2:
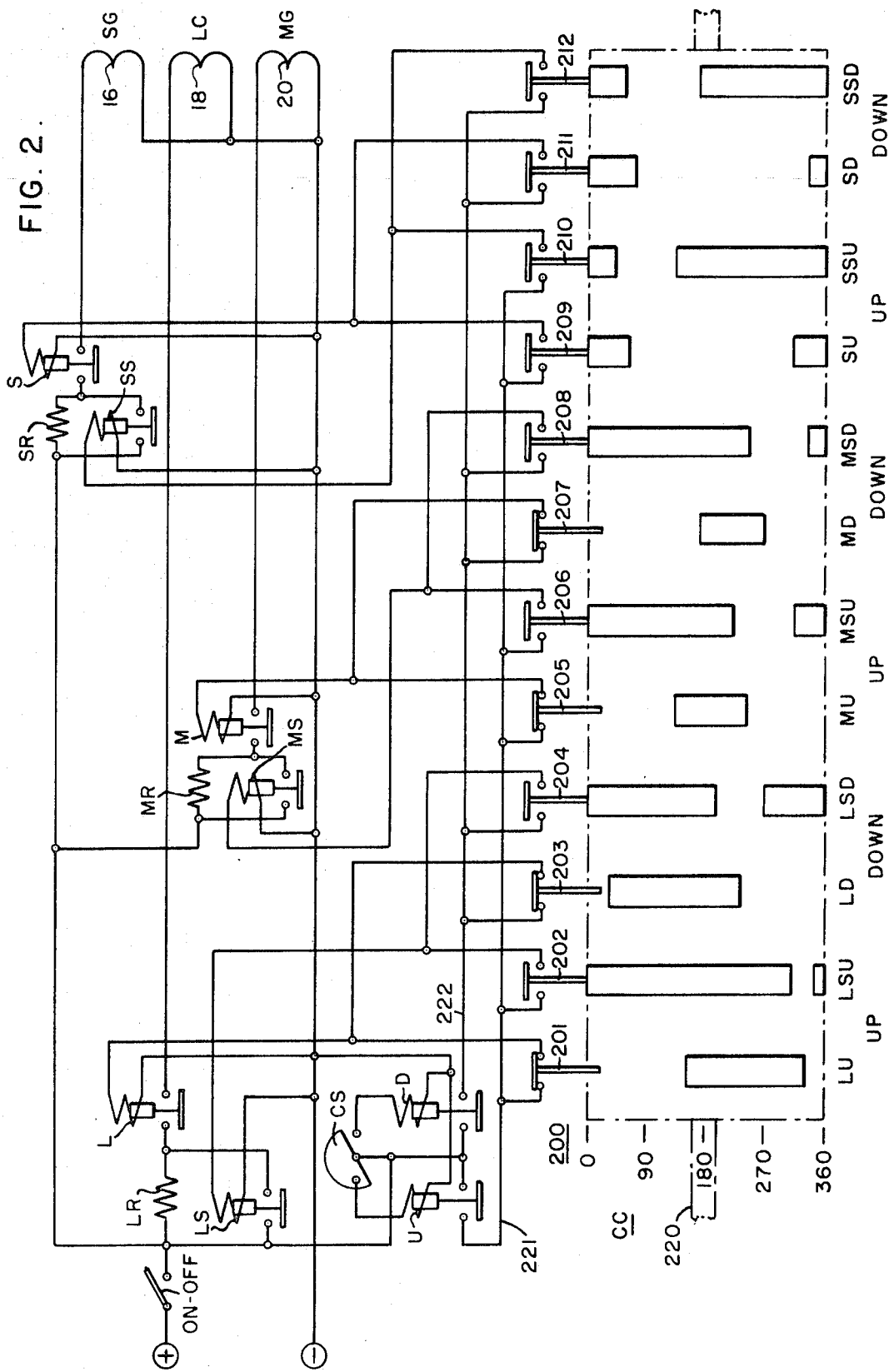
FIG. 2 is a diagrammatic view of a control system for controlling the operation of the device shown in FIGS. 1A and 1B.

The sequence of energization of the solenoids 16, 18 and 20 together with the resulting movement of the upper and lower gripper arrangements 58 and 60 will now be described for the purpose of providing incremental upward movement of the lead screw 62. As shown in FIG. 2, the energization of the solenoids 16, 18 and 20, which are also designated SG, LC and MG, respectively, is controlled by control means, such as a controller CC. As shown, the controller CC is of the cam switch type having a plurality of cam switches 200 which are closed by springs (not shown), and are opened by rotatable cams driven by a shaft 220. The shaft 220 may be driven by a motor (not shown), the speed of operation of which may be controlled in a manner well known in the art. Controllers of other types, such as a drum controller, may be utilized if desired. In addition to the controller CC, the control system includes electromagnetically operated contactors U and D to determine the direction of movement of the element 62, a manually operable control switch CS, which is of the make-before break type, for controlling the energization of the contactors U and D, and an Off-On switch for controlling the energization of the system. The control system also includes electromagnetic contactors L and LS and a resistor LR associated with the lift solenoid 18, electromagnetic contactors M and MS and a resistor MR associated with the movable gripper solenoid coil 20, and electromagnetic contactors S and SS and a resistor SR associated with the stationary gripper solenoid 16.

In one embodiment of this invention, the clearance between the teeth or projection 88 and the gripper tip may be sized as 1/32 inch. The pitch of the lead screw 62 or the distance between adjacent teeth 88 desirably is 3/8 inch and the gap 118 is 7/16 inch. To provide incremental upward movement of the lead screw 62, it will be assumed that the linear motion device is in the operating state illustrated in FIGS. 1A and 1B, that is, the solenoid 16 is deenergized and the solenoids 18 and 20 are energized. It will also be assumed that the switch CS is in the position shown to energize the contactor U when the Off-On switch is closed. The closing of the contactor U energizes conductor 221. When the cam controller CC is in the position shown, cam switches 209 and 210 are opened by cams SU and SSU, respectively, thereby deenergizing contactors S and SS which are open to deenergize the coil 16.

At this time, cam switch 201 is closed to energize contactor L, thereby closing its contacts to energize the coil 18. However, cam switch 202 is opened by a cam LSU, thereby deenergizing the contactor LS to insert the resistor LR in the circuit for the coil 18. Likewise, cam switch 205 is closed to energize the contactor M and close its contacts to energize the coil 20. Cam switch 206 is opened by the cam MSU, thereby deenergizing the contactor MS to insert the resistor MR in the circuit for the coil 20.

Upward incremental movement of the lead screw 62 will begin by rotating the cam controller CC to energize the upper solenoid 16. As the controller CC rotates, cam switch 209 is closed to energize the contactor S, thereby closing its contacts to energize the coil 16. It will be noted that cam switch 210 closes prior to the closing of switch 209, thereby energizing contactor SS to close its contacts to shunt the resistor SR from the energizing circuit for the coil 16, prior to the closing of the switch S. In this manner, full voltage is applied to the coil S when it is first energized. Such energization of the solenoid coil 16 will establish a magnetic field in the gap 118 tending to close the latter. As a result, magnetic pole 112 moves toward the stop 64 and the latch arms 136 are driven toward the lead screw 62 by pivotal movement of the links 134 until the tips 140 of the latch arms 136 assume a position in which a clearance exists between the adjacent teeth 88 and the tips 140. During the last-mentioned movement, the tips 140 of the latch arms 136 do not come into contact with the teeth 88 of the lead screw 62 and the arms 136 are in the "coupled" position. The axial position of the latch arms 136 remains unchanged in this period since the latch support tube 110 is held in its original position by the spring 126. At this point of the travel, the flange 171 at the lower end of the extension 128 engages the shoulder 173 adjacent the lower end of the support tube 110 with the consequence that the support tube 110, and with it the latch arms 136 are forced upwardly during the last part of the magnet travel until the air gap 118 is completely closed. This last 1/16 inch of travel takes up the clearance of 1/32 inch placing the arms 136 in their "latched" position and move the lead screw upwardly through an increment of 1/32 inch, thereby transferring the load created by the weight of the lead screw 62 from the lower latch arms 84 to the upper latch arms 136. A clearance of 1/32 inch will now exist between the tops 86 of the lower latch arms 84 and the adjacent teeth 88, and the arms 84 are now in the "coupled" position.

It will be noted that cam switch 210 is opened by cam SSU, thereby deenergizing the contactor SS to insert the resistor SR in the circuit for the coil 16 which reduces the applied voltage on the coil. However, the voltage and the current in the coil are sufficient to retain the latch arms 136 in engagement with the teeth on the lead screw 62.

The next step in the sequence of operation is to deenergize the lower solenoid 20. Cam switch 205 is opened by cam MU thereby deenergizing contactor M to open its contacts and deenergize the coil 20. At this time, cam switch 206 is open and the contactor MS is deenergized. Thus, the resistor MR is connected in the circuit for the coil 20 when it is deenergized, thereby permitting a more rapid decay of the flux in the magnetic circuit for the coil and reducing the time required for the lower latch operating magnetic pole to drop under the impetus of the spring 148 to move the gripper arms 84 from a "coupled" position to the "unlatched" position with the upper gripper arms 136 remaining in the "latched" position. It is to be noted that the movement of the gripper arms 84 to the "unlatched" position is permitted without making contact with the teeth 88 of the lead screw 64, thereby preventing wear on these parts.

The lift solenoid 18 is now deenergized and the entire lift magnetic assembly, including the lift pole 142, the latch operating magnetic pole 104 and the spring support plunger 146, moves downwardly to its bottom position by impetus of the spring 164 until the lower surface 168 engages the damping washers 170. Deenergization of the lift coil 18 is effected by opening cam switch 201 by means of cam LU, thereby deenergizing contactor L and opening its contact members to open the circuit for the coil 18. Cam switch 202 is open at this time and the contactor LS is open. Thus, the resistor LR is connected in the circuit for the coil 18 when it is deenergized, thereby permitting a rapid decay of the flux in the magnetic circuit for the solenoid 18 and decreasing the dropout time of the solenoid.

Energization of the lower solenoid 20 moves the latch operating pole 104 into engagement with the lower end of the lift pole 142, thereby moving the latch arms 84 from the "unlatched" position to the "coupled" position, so that the tips 86 of the latch arms 84 are not in actual contact with the teeth 88. Cam switch 206 is permitted to close prior to the closing of the switch 205, thereby closing contactor MS to shunt the resistor MR from the energizing circuit for the coil 20. In this manner, full voltage is applied to the coil 20 when it is first energized by closing contactor M. The resistor MR is inserted in the circuit for the coil 20 by the opening of the cam switch 206 and the contactor MS sometime after the contactor M is closed to energize the coil 20.

indicated by the arrows 114 is forced through the stationary pole 64 and the movable plunger 112 by the non-magnetic insert 12 juxtaposed to the solenod coil 14.

In FIG. 1A of the drawings, the solenoid 16 is shown with its coil 14 deenergized. The solenoid 16 is provided with two poles, one of which is movable and the other of which is stationary. The stationary pole comprises the annular stop member 64. The movable pole, which is disposed below the stationary pole 64 comprises the gripper operating pole or plunger 112. A relatively thin wear resistant non-magnetic washer 116 is disposed on top of the plunger 112 and is adapted to move into engagement with the lower surface of the stationary pole 64. The non-magnetic washer 116 serves to reduce the decay time of the magnetic flux in the air gap 118 upon deenergization of the coil 16, thereby speeding up moveemnt of the magnet pole or plunger 112.

The closing of the air gap 118 is resisted by a spring 120 which is disposed in compression between opposed surfaces of the upper stop 64 and the gripper operating magnetic pole 112. The spring 120, however, is so designed as to increase the air gap 118 to a maximum only when the solenoid 16 is deenergized. The magnetic force between the poles 64 and 112 created by the solenoid 16, is of such magnitude as to overcome the force of the spring 120.

A ring member 122 is secured to the inner surface of the spacing sleeve 72 and abuts a shoulder 124 formed thereon. Resilient means, such as a spring 126, is disposed between the ring member 122 and the upper end of the latch support tube 110. The spring 126 is desirably under compression and resists upward movement of the latch support tube 110 toward the ring member 122. Accordingly, upon energization of the solenoid 16 the air gap 118 begins to close. Inasmuch as the upper stop 64 is fixedly positioned, closing of the air gap 118 is accomplished solely by the upward movement of the gripper operating pole 112 toward the stop 64.

The gripper operating pole 112 is provided with a lower annulus 128 threadly secured thereto at 130 which is formed to receive a pivot pin 132 upon which there is mounted a link member 134. The link member 134 is capable of moving pivotally about pivot pin 132. Similarly, the link member 134 is pivotally secured to a latch arm 136 of the upper gripper arrangement 58 in a manner similar to that described in connection with the lower gripper arrangement 60. The gripper arm 136 is pivotally mounted on the gripper support tube 110 by a pivot pin 138 which functions similarly to the pivot pin 90 of the lower gripper arrangement 60.

Upon closing of the air gap 118, the pivot pin 132 is moved upwardly into substantial alignment with the pivot pin 135 causing the gripper arm 136 to pivot about the pivot pin 138 so that its Stellite tip 140 moves through an opening 141 in the spacing tube 72 to a position between adjacent teeth 88 of the lead screw 62. During this portion of the closing of the air gap 118 only the last-described movement takes place because the gripper support tube 110 is restrained from corresponding upward movement by the spring 126. It will be noticed, however, that the lower end of the member 128 is provided with an inwardly extending flange 171 which is disposed in vertical alignment with a shoulder 173 of the gripper support tube 110. The distance of travel of the flange 171 until it is in engagement with the shoulder 173 is constructed to be slightly smaller than the air gap 118 so that upon the final closing movement of the air gap 118, the flange 171 moves the gripper support tube 110 upwardly against the force of the spring 126. A particular need for this last-mentioned movement of the gripper support tube 110 will be described hereinafter in conjunction with the description of the operation of the linear motion device.

The lower solenoid 20 controls the movement of the lower gripper arrangement 60 between the "latched," "coupled" and "unlatched" positions. As illustrated in FIG. 1B, the solenoid 20 is energized. The poles of the lower solenoid 20 comprise the latch operating magnetic pole 104 and a lift pole 142, both of which are formed from magnetic material. Thus, when the solenoid 20 is deenergized an air gap exists between the lift pole 142 and the latch operating pole 104. The length of the last-mentioned air gap is defined by the upper surface 144 of a spring support plunger 146 which is axially aligned with the operating pole 104. Resilient means, such as a spring 148 is mounted in compression between opposed surfaces of the lift pole 142 and the operating pole 104 to insure the opening of the air gap between the last-mentioned poles upon deenergization of the solenoid 20. A non-magnetic washer 150 is placed on the upper surface of the latch operating pole 104 and serves the same function as the washer 116. Upon deenergization of the solenoid 20, the latch operating pole 104 moves downwardly until its lower surface engages the surface 144 of the spring support plunger 146. The pivot pin 108 also moves downwardly causing the link 102 to pivotally move in a counterclockwise direction about the pivot pin 108 with the resulting effect that the tip 86 of the gripper arm 84 is swung out of engagement with the adjacent tooth 88 of the lead screw 62. Upon completion of this last-mentioned motion, the latch arm 84 is located in the "unlatched" position similar to that shown for the latch arm 136 in FIG. 1A.

As will be pointed out hereinafter, deenergization of the solenoid 20 normally would not be permitted while the latch arm 84 is in the "latched" position. Before deenergization of the solenoid 20 is permitted, the solenoid 16 will be energized so that the gripper arm 136 is in the "latched" position which will result in the location of the gripper arm 84 in the "coupled" position. As illustrated in FIG. 1B, the gripper support tube 94 is threadedly mounted on the lift 142 at 152. The latch support tube 94 is provided at its lower end with an extension 154 disposed below the gripper arms 84 and having a threaded outer sidewall 156. Complementary threads are formed on the spring support plunger 146 to permit the securing of the spring support plunger 146 to the extension 154 at the wall 156. The lower end of the spring support plunger 146 is provided with an inwardly extending circumferential flange 158 which extends to a position closely adjacent to the outer surface of the spacer sleeve 70. An annular washer 160 is secured against an outwardly extending shoulder 162 formed on the spacer sleeve 70 and disposed between the lower end of the extension 154 and the flange 158. Resilient means, such as a pull-down spring 164, is disposed in compression between the stop washer 160 and the flange 158 to exert a constant downward force on the flange 158 with the last-mentioned downward force also being exerted on the lift pole 142.

The intermediate or lift solenoid 18 provides a flux path similar to the flux path 114 of the solenoid 16. The poles of the lift solenoid 18 comprise the central stop or stationary pole 66 and the lift pole or plunger 142. The air gap for the lift solenoid 18 is disposed between the adjacent surfaces of the poles 66 and 142. In the drawing, the lift solenoid 18 is shown in its energized condition with the air gap between the poles 66 and 142 being closed. A non-magnetic washer 166 is mounted between the opposed surfaces of these poles. Deenergization of the lift coil 18 would result in the opening of the air gap between the poles 66 and 142. The opening of this air gap would be assisted by the pull-down spring 164. The size of the air gap would be defined by the distance between the lower surface 168 of the plunger 146 and the upper surface of the lower stop 68.

Two or more washers 170 may be provided on the upper surface of the lower stop 68 to dampen the shock when surface 168 of the plunger 146 contacts the washers. Fluid trapped between the washers will be squeezed out at a high velocity and absorb some of the kinetic energy before a solid stop is achieved. Desirably, the gap for the lift The upper solenoid 16 is now deenergized causing the opening of the gap 118 and a downward movement of the latch operating pole 112 and gripper support tube 110 under the impetus of the springs 120 and 126, respectively. Cam switch 209 is opened by cam SU, thereby deenergizing contactor S to open its contacts and deenergize the coil 16. It is to be noted that cam switch 210 and contactor SS are open when contactor S is opened to deenergize the coil 16. Thus, the resistor SR is connected in the circuit for the coil 16 when the circuit is opened, thereby permitting a more rapid decay of the flux in the magnetic circuit for the coil.

The speed of the downward movement of the gripper support tube 110 is limited by the speed of movement downwardly of the flange 171. The force exerted by the spring 126 is of such a magnitude as to permit more rapid lowering of the gripper support tube 110 than the speed of lowering the magnetic pole piece 112. On this basis, for the first $1/16$ inch of travel of the latch support tube 110 carrying with the gripper arms 136, the flange 171 defines the upper limits of the speed of downward movement of the gripper support tube 110. During the first $1/16$ inch of travel, the gripper support tube 110 and the pole 112 move substantially as a unit. When the gripper support tube 110 has moved its first $1/16$ inch, the lower end 180 thereof engages a stop ring 172 and prevents further downward movement of the support tube 110. The first $1/32$ inch of downward movement also moves the lead screw 62 downwardly to absorb the clearance between the lead screw teeth and the tip 86 of the lower gripper arm 84, placing the lower gripper arm in the "latched" position. The second $1/32$ inch of movement completes the freeing of the tips 140 of the upper gripper arms 136 from contact with the lead screw 62. During the latter part of the travel of the pole 112, the tip of 140 are withdrawn from the grooves between the lead screw teeth moving the grippers 136 to the "unlatched" position.

Incremental movement of the lead screw 62 upwardly is completed by energizing the lift solenoid coil 18 until the air gap between the pole 66 and the pole 142 is closed. It is shown that cam switch 202 is permitted to close prior to the closing of cam switch 201. Thus, the contactor LS is closed to shunt the resistor LR from the circuit for the coil 18 when the contactor L is closed to energize this circuit. In this manner full voltage is applied to the coil 18 shown it is first energized. Some time after the coil is energized cam switch 202 and contactor LS are opened to connect the resistor LR in the circuit for the coil 18.

To continue incremental movement in the upward direction the whole cycle as described above is merely repeated. Thus, the lead screw 62 is raised one step for each revolution of the controller CC.

Downward movement of the lead screw 62 is achieved by sequentially energizing and deenergizing the solenoid coils 16, 18 and 20 in the following manner. The control switch CS is actuated to energize the contactor D and deenergize the contactor U. The closing of the contact D energizes a conductor 222 and deenergizes the conductor 221.

With the linear motion device in the position shown in FIGS. 1A and 1B, the first step to obtain downward incremental movement is to deenergize the lift coil 18 causing the lower gripper arms 84 and the lead screw 62 to move downwardly until the surface 168 of the plunger 146 engages the washers 170. Rotation of the controller CC opens the cam switch 203 by means of the cam LD thereby deenergizing the contactor L to open its contact and deenergize the coil 18. At this time cam switch 204 and contactor LS are open and the resistor LR is connected in the circut for the coil 18 when it is deenergized, thereby permitting a rapid decay of the flux in the magnetic circuit for the coil.

Next, the solenoid coil 16 is energized, moving the tips of the gripper arms 136 to the "coupled" position between adjacent teeth 88 of the lead screw until the flange 171 engages the shoulder 173, and then lifting the lead screw 62 and the gripper arms 136 for an additional $1/16$ inch to move the tips 140 from the "coupled" position to the "latched" position and whereupon the tips 86 of the lower gripper arms 84 are placed in the "coupled" position. Cam switch 212 is closed prior to the closing of cam switch 211, thereby closing contactor SS prior to the closing of contactor S to energize the coil 16. In this manner, the resistor SR is shunted from the circuit for the coil 16 when it is energized, thereby applying full voltage to the coil when it is first energized.

The lower solenoid 20 is deenergized, moving the gripper arm 84 from the "coupled" position to the "unlatched" position. The coil 20 is deenergized by opening cam switch 207 by means of cam MD to deenergize contactor M and open its contacts to deenergize the coil 20. At this time cam switch 208 and contactor MS are open and the resistor MR is connected in the circuit for the coil 20.

The lift coil 18 is then energized moving the lift pole 142 into engagement with the stop 66 with the lift pole 142 also moving the gripper arms 84 upwardly for a distance equal to one tooth pitch. The lift coil 18 is energized by closing cam switch 203 and contactor L. Cam switch 204 and contactor LS are closed to shunt the resistor LR from the circuit for the coil 18 when it is first energized.

The lower solenoid 20 is then energized, moving the gripper arms 84 from the "unlatched" position to the "coupled" position. The solenoid 20 is energized by closing cam switch 207 and contactor M. At this time cam switch 208 and contactor MS are closed to shunt the resistor MR from the circuit for the coil 20 when it is first energized. Finally, the cycle is completed by deenergizing the solenoid 16 which accomplishes the movement of the upper gripper arms 136 to the "coupled" position, thereby placing the gripper arms 84 in the "latched" position and then moving the gripper arms 136 to the "unlatched" position. The coil 16 is deenergized by opening cam switch 211 and contactor S. The cycle is then repeated to obtain further incremental downward movement of the lead screw 62. Thus, the lead screw is moved downwardly one step for each revolution of the controller CC.

From the foregoing description it is apparent that the invention provides a control system for a linear motion device which increases the speed of operation of the device by reducing the mechanical dropout time of the electromagnetic means for moving the linear element of the device. The mechanical dropout time is reduced by reducing the strength of the magnetic field associated with each electromagnetic means after the requirement for full strength has passed, but prior to the time complete deenergization of the electromagnetic means is scheduled in a sequence of operation. Additional advantages obtained by the use of the control system are improved life of the contact members in the contactors due to reduced interrupting requirement, reduction of the voltage induced on circuit opening, and reduction in coil heating during stepping operation.

Since numerous changes may be made in the above-described construction and different embodiments of the invention may be made without departing from the spirit and scope thereof, it is intended that all subject matter contained in the foregoing description or shown in the accompanying drawings shall be interpreted as illustrative and not in a limiting sense.

I claim as my invention:

1. In a control system for a linear motion device, in combination, a generally tubular housing, a linearly movable element disposed in said housing, said element having a plurality of spaced teeth thereon, gripper means for engaging said teeth, electromagnetic means for actuating said gripper means, additional electromagnetic means for moving said element through said gripper means, control means controlling sequential energization and deenergization of the electromagnetic means, and additional control means for applying a predetermined voltage to at least one electromagnetic means when first energized and for reducing the applied voltage before deenergization of said one electromagnetic means.

2. The combination defined in claim 1 wherein each electromagnetic means comprises a coil surrounding the outside of the housing and a relatively stationary pole and a movable pole disposed inside the housing.

3. The combination defined in claim 2, wherein the control means includes a rotatable controller and a plurality of electromagnetic contactors.

4. The combination defined in claim 3, wherein the additional control means includes additional electromagnetic contactors and resistors.

5. The combination defined in claim 4, wherein the rotatable controller controls the operation of the contactors to utilize the resistor to decrease the current in the magnetic coils and to decrease the time required for decay of flux in the magnet poles.

6. In a control system for a linear motion device, in combination, a linearly movable element having a plurality of spaced projections thereon, a relatively stationary gripper assembly and a movable gripper assembly for engaging said projections, electromagnetic means for actuating each gripper assembly, additional electromagnetic means for moving said element in cooperation with the movable gripper assembly, control means for controlling sequential energization and deenergization of the electromagnetic means to move said element step-by-step, and additional control means for applying a predetermined voltage to each electromagnetic means when first energized and for reducing the applied voltage before deenergization of each electromagnetic means to increase the speed of movement of said element.

7. The combination defined in claim 6, wherein the control means includes switch means and in electromagnetic contactor associated with each electromagnetic means.

8. The combination defined in claim 7, wherein the additional control means includes a resistor and an additional electromagnetic contactor associated with each electromagnetic means.

9. The combination defined in claim 8, including rotatable means for sequentially actually said switch means.

References Cited
UNITED STATES PATENTS

| | | | |
|---|---|---|---|
| 2,989,666 | 6/1961 | Brenner et al. | 317—123 |
| 3,132,290 | 5/1964 | Kumpf | 317—123 |
| 3,158,766 | 11/1964 | Frisch | 310—14 |
| 3,218,534 | 11/1965 | Casey | 310—17X |

DONOVAN, F. DUGGAN, Primary Examiner

U.S. Cl. X.R.

176—36; 310—14